(12) United States Patent
Yang et al.

(10) Patent No.: US 12,129,860 B2
(45) Date of Patent: Oct. 29, 2024

(54) FAN AND ELECTRONIC DEVICE

(71) Applicant: HONOR DEVICE CO., LTD., Shenzhen (CN)

(72) Inventors: Tao Yang, Shenzhen (CN); Yong Zhao, Shenzhen (CN); Man Gao, Shenzhen (CN); Guoliang Huo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/018,747

(22) PCT Filed: Aug. 29, 2022

(86) PCT No.: PCT/CN2022/115504
§ 371 (c)(1),
(2) Date: Jan. 30, 2023

(87) PCT Pub. No.: WO2023/065824
PCT Pub. Date: Apr. 27, 2023

(65) Prior Publication Data
US 2024/0254993 A1    Aug. 1, 2024

(30) Foreign Application Priority Data

Oct. 18, 2021    (CN) .......................... 202111211340.5

(51) Int. Cl.
*F04D 17/16*    (2006.01)
*F04D 29/42*    (2006.01)
(Continued)

(52) U.S. Cl.
CPC ......... *F04D 17/16* (2013.01); *F04D 29/4213* (2013.01); *F04D 29/624* (2013.01); *G06F 1/203* (2013.01)

(58) Field of Classification Search
CPC ... F04D 17/16; F04D 29/4213; F04D 29/4226
See application file for complete search history.

(56) References Cited

U.S. PATENT DOCUMENTS 6,333,852 B1 * 12/2001 Lin ........................... G06F 1/20
165/185
6,442,024 B1 * 8/2002 Shih .......................... G06F 1/20
361/695

(Continued)

FOREIGN PATENT DOCUMENTS

CN    101674715 A    3/2010
CN    205793929 U    12/2016
(Continued)

*Primary Examiner* — Brian O Peters

(57) ABSTRACT

This application provides a fan and an electronic device. The fan includes a body, and an air duct, an air outlet and a flow guiding inlet are formed in the body; the air duct includes an air inlet area and an air outlet area, and a flow guiding member is disposed in the air outlet area; the flow guiding member and the body form a first channel, a second channel, and a third channel. After a main airflow in the air inlet area enters the first channel and the third channel, a negative pressure area is formed at the flow guiding outlet, a differential pressure exists between air pressures in the negative pressure area and the second channel, and the differential pressure enables air to enter the flow guiding cavity from the flow guiding inlet to form an induced airflow, thereby increasing an air output.

20 Claims, 12 Drawing Sheets

(51) Int. Cl.
*F04D 29/62* (2006.01)
*G06F 1/20* (2006.01)

(56) References Cited

U.S. PATENT DOCUMENTS

| | | |
|---|---|---|
| 2009/0004961 A1 | 1/2009 | Mongia |
| 2010/0065254 A1 | 3/2010 | Chang et al. |
| 2012/0018137 A1 | 1/2012 | Chang et al. |

FOREIGN PATENT DOCUMENTS

| | | |
|---|---|---|
| CN | 110195724 A | 9/2019 |
| CN | 112780060 A | 5/2021 |
| CN | 213206109 U | 5/2021 |
| CN | 112965583 A | 6/2021 |
| CN | 214036208 U | 8/2021 |
| CN | 113970960 A | 1/2022 |
| EP | 3779208 A1 | 2/2021 |
| WO | 2018032856 A1 | 2/2018 |

\* cited by examiner

FAN AND ELECTRONIC DEVICE

This application is a national stage of International Application No. PCT/CN2022/115504, filed on Aug. 29, 2022, which claims priority to Chinese Patent Application No. 2021112113405, filed on Oct. 18, 2021. The disclosures of both of the aforementioned applications are hereby incorporated by reference in their entireties.

TECHNICAL FIELD

This application relates to the field of heat dissipation technologies for electronic products, and in particular, to a fan and an electronic device.

BACKGROUND

Currently, electronic components such as processors inside electronic devices will emit heat during operation. If the heat emitted by the electronic components during operation cannot be dissipated in a timely manner, the electronic devices will stop operating, and in severe cases, the processors may be burned out. To resolve the foregoing problem, existing manufacturers have arranged fans in electronic devices to dissipate heat from components such as processors. However, existing fans have poor heat dissipation capabilities.

SUMMARY

This application provides a fan and an electronic device, so as to improve a heat dissipation effect and prevent overheating of electronic components such as processors.

According to a first aspect, this application provides a fan, including a body. The body includes an end cover, a bottom cover, a peripheral plate, blades, and a flow guiding member; the end cover and the bottom cover are opposite and spaced apart, two opposite sides of the peripheral plate in a thickness direction of the fan are connected to the end cover and the bottom cover respectively: the end cover, the bottom cover, and the peripheral plate form an air duct extending in a length direction of the fan, and the blades and the flow guiding member are mounted between the end cover and the bottom cover.

The air duct includes an air inlet area and an air outlet area that are sequentially distributed and communicated in the length direction of the fan: the end cover is provided with an air inlet communicated with the air inlet area: a part between the end cover and the bottom cover is not connected by a connecting plate to form an air outlet: the air outlet area is corresponding to the air outlet and is communicated with the air outlet; and the blades are located in the air inlet area, and the flow guiding member is located in the air outlet area.

The flow guiding member includes a first guide plate, a second guide plate, and a sleeve; the end cover, the first guide plate, the second guide plate, and the bottom cover are sequentially laminated and spaced apart in the thickness direction of the fan, so that a first channel is formed between the first guide plate and an inner wall of the air duct, the first guide plate and the second guide plate are oppositely spaced apart to form a second channel, and a third channel is formed between the second guide plate and the inner wall of the air duct; and the first channel, the second channel, and the third channel are sequentially disposed in the thickness direction of the fan.

The sleeve is located in the first channel or the third channel, and includes a flow guiding cavity; one side that is of the second channel and that faces the air inlet area is isolated from the air inlet area, one side that is of the second channel and that faces away from the air inlet area forms a flow guiding outlet, and the flow guiding outlet and the air outlet face the same direction and are communicated.

In the length direction of the fan, the air inlet area, the first channel, and the air outlet are sequentially communicated to form an air flow path, and the air inlet area, the third channel, and the air outlet are sequentially communicated to form another air flow path. In the thickness direction of the fan, the flow guiding inlet, the flow guiding cavity, and the second channel are sequentially communicated; and in the length direction of the fan, the second channel is also communicated with the flow guiding outlet and the air outlet, and finally the flow guiding inlet, the flow guiding cavity, the second channel, the flow guiding outlet, and the air outlet are sequentially communicated to form still another air flow path.

In this embodiment, when the fan is operating, the blades in the air inlet area rotate to allow outside air to enter the air inlet area from the air inlet to form a main airflow, and then the main airflow flows from the air inlet area to the air outlet area, and finally blows out through the air outlet. When the main airflow flows to the air outlet area, because the second channel is separated from the air inlet area, the main airflow is divided into two streams to enter the first channel and the third channel respectively. Because spaces of the first channel and the third channel are smaller than a space of the air inlet area, a flow rate of the main airflow divided into two streams is increased after entering the first channel and the third channel. When two streams of high-speed main airflow flow through the flow guiding outlet on one side that is of the second channel and that is away from the air inlet area, negative pressure areas are formed on two sides of the flow guiding outlet. Air pressures in the negative pressure areas are lower than an air pressure in the second channel, resulting in a differential pressure between air pressures in the negative pressure areas and the second channel. Under an action of the differential pressure, outside air is induced to enter the flow guiding cavity from the flow guiding inlet to form an induced airflow, then the induced airflow enters the second channel from the flow guiding cavity, finally flows to the air outlet through the flow guiding outlet, and then blows out from the air outlet. When flowing to the air outlet, the two streams of high-speed main airflow rub against the body at the air outlet. Under an action of friction, the high-speed main airflow drives ambient air to generate a driven airflow. Therefore, at the air outlet of the fan, a total air output of the fan includes three parts: the main airflow, the induced airflow, and the driven airflow. Compared with a conventional component without the flow guiding member, the air output is significantly increased, and therefore, heat dissipation efficiency is improved.

Because the sleeve is located in the first channel or the third channel, the main airflow is blocked by the sleeve when flowing through a position where the sleeve is located. In this case, a flow rate of the main airflow is further increased, so that the differential pressure between air pressures in the negative pressure areas and the second channel is more significant. Therefore, more air is induced to enter the flow guiding cavity to form an induced airflow with a larger air volume.

In an embodiment, the body includes an end cover, the end cover forms an inner wall that is of the air duct and that is corresponding to the first guide plate, the sleeve includes a first sleeve, and the first sleeve is located in the first channel, and is hermetically connected to the end cover and the first guide plate respectively along two opposite ends in the thickness direction of the fan; the flow guiding inlet includes a first flow guiding inlet formed on the end cover, the flow guiding cavity includes a first flow guiding cavity formed on the first sleeve, and the first flow guiding cavity is communicated with the first flow guiding inlet and the second channel. The first sleeve is disposed, and a flow guiding cavity of the first sleeve is referred to as the first flow guiding cavity. Then a flow rate of a part of the main airflow entering the first channel is further increased due to blocking of the first sleeve. When the main airflow in the first channel flows through the flow guiding outlet, the differential pressure between air pressures in the negative pressure areas and the second channel is more significant. Under an action of the differential pressure, outside air enters the first flow guiding cavity from the first flow guiding inlet to form a first induced airflow, the first induced airflow then enters the second channel from the first flow guiding cavity, and finally flows to the air outlet through the flow guiding outlet, thereby increasing the total air output of the fan.

In an embodiment, the first guide plate is disposed around a periphery of the first sleeve, so that the first channel surrounds the periphery of the first sleeve. Therefore, the first sleeve is located in the middle of the first channel in the length direction of the fan. In this case, the flow rate of the part of the main airflow entering the first channel is increased once due to a spatial difference between the first channel and the air inlet area, and the flow rate is increased once again under blocking of the first sleeve, so that the part of the main airflow in the first channel may be accelerated twice.

In an embodiment, an edge that is of the first guide plate and that faces the air inlet area is aligned with a part of an edge of the first sleeve. Therefore, the first sleeve is located at an edge that is of the first channel and that faces the air inlet area. In this case, the flow rate of the part of the main airflow entering the first channel is increased rapidly due to the spatial difference between the first channel and the air inlet area and blocking of the first sleeve.

In an embodiment, the sleeve includes a plurality of first sleeves, the flow guiding inlet includes a plurality of first flow guiding inlets formed on the end cover, and the plurality of first flow guiding inlets are in a one-to-one communication with the plurality of first sleeves. The plurality of first sleeves and the plurality of corresponding first flow guiding inlets are disposed, so that an air volume of the first induced airflow is increased, thereby further increasing the total air output of the fan.

In an embodiment, the plurality of first sleeves and the plurality of first flow guiding inlets are equally spaced apart in the thickness direction of the fan. Therefore, the first induced airflow is evenly distributed, so that air outflow uniformity at the air outlet may be increased.

In an embodiment, the body includes a bottom cover, the bottom cover forms an inner wall that is of the air duct and that is corresponding to the second guide plate, the sleeve includes a second sleeve, and the second sleeve is located in the third channel, and is hermetically connected to the bottom cover and the second guide plate respectively along two opposite ends in the thickness direction of the fan; and the flow guiding inlet includes a second flow guiding inlet formed on the bottom cover, the flow guiding cavity includes a second flow guiding cavity formed on the second sleeve, and the second flow guiding cavity is communicated with the second flow guiding inlet and the second channel. The second sleeve is disposed, and a flow guiding cavity of the second sleeve is referred to as the second flow guiding cavity. Then a flow rate of a part of the main airflow entering the third channel is further increased due to blocking of the second sleeve. When the main airflow in the third channel flows through the flow guiding outlet, the differential pressure between air pressures in the negative pressure areas and the second channel is more significant. Under an action of the differential pressure, outside air enters the flow guiding cavity of the second sleeve from the second flow guiding inlet to form a second induced airflow, the second induced airflow then enters the second channel from the second flow guiding cavity, and finally flows to the air outlet through the flow guiding outlet, thereby increasing the total air output of the fan.

In an embodiment, the second guide plate is disposed around a periphery of the second sleeve, so that the third channel surrounds the periphery of the second sleeve. Therefore, the second sleeve is located in the middle of the third channel in the length direction of the fan. In this case, the flow rate of the part of the main airflow entering the third channel is increased once due to a spatial difference between the third channel and the air inlet area, and the flow rate is increased once again under blocking of the second sleeve, so that the part of the main airflow in the third channel may be accelerated twice.

In an embodiment, the sleeve includes a plurality of second sleeves, the flow guiding inlet includes a plurality of second flow guiding inlets formed on the bottom cover, and the plurality of second flow guiding inlets are communicated with the plurality of second sleeves in a one-to-one correspondence. The plurality of second sleeves and the plurality of corresponding second flow guiding inlets are disposed, so that an air volume of the second induced airflow may be increased, thereby further increasing the total air output of the fan.

In an embodiment, the plurality of second sleeves and the plurality of second flow guiding inlets are equally spaced apart in a width direction of the fan. Therefore, the second induced airflow is evenly distributed, so that air outflow uniformity at the air outlet may be increased.

In an embodiment, in a direction perpendicular to the thickness direction, the flow guiding inlet and the flow guiding cavity are opposite, and have the same cross-sectional area and shape. Therefore, compared with a situation in which the flow guiding inlet and the flow guiding cavity are not aligned, the flow guiding inlet and the flow guiding cavity are aligned, so that a resistance to an induced airflow may be reduced, thereby reducing losses of the induced airflow, and ensuring that almost all of the induced airflow enters the second channel.

In an embodiment, in the length direction of the fan, widths of the first guide plate, the second guide plate, and the air outlet area are the same. Therefore, the first guide plate, the second baffle, the end cover, and the bottom cover are flush at the air outlet, so as to facilitate machining.

In an embodiment, the air outlet area includes a mounting area and a guide area, the mounting area is corresponding to the air inlet area and is communicated with the air inlet area, and the guide area is corresponding to the air outlet and is communicated with the air outlet; and the flow guiding member is mounted in the mounting area, and in the length direction of the fan, widths of the first guide plate, the second guide plate, and the mounting area are the same. Therefore, the first guide plate and the second guide plate are retracted with respect to the air outlet to be hidden in the air duct, so as to reduce a weight of the fan, prevent the first guide plate and the second guide plate from shielding the guide area, guide an airflow in the guide area, and provide a surface with a Coanda effect.

In an embodiment, the body includes an end cover and a bottom cover that are opposite and spaced apart, the end cover includes a first guide surface facing the air duct, and a first convex portion is formed in the middle of a part that is of the first guide surface and that faces the guide area; and the bottom cover includes a second guide surface facing the air duct, a second convex portion is formed in the middle of a part that is of the second guide surface and that faces the guide area, and the first convex portion and the second convex portion protrude toward each other. Therefore, the first guide surface and the second guide surface become curved surfaces with a Coanda effect, and the surfaces with the Coanda effect enable an airflow to flow more smoothly, thereby reducing turbulence at the air outlet and reducing air volume losses.

In an embodiment, the sleeve includes an inner wall surface facing the flow guiding cavity, and an outer wall surface facing away from the inner wall surface, and the outer wall surface is streamlined. The streamlined outer wall surface has a small resistance to an airflow, and when the airflow flows through the outer wall surface, air volume losses are small.

In an embodiment, the flow guiding member further includes a connecting plate, two opposite sides of the connecting plate in the thickness direction of the fan are respectively connected to the first guide plate and the second guide plate, the connecting plate separates the second channel from the air inlet area, and sides that are of the first guide plate and the second guide plate and that face away from the connecting plate face the air outlet area and form the flow guiding outlet. The connecting plate connects sides that are of the first guide plate and the second guide plate and that face the air inlet area, thereby isolating the second channel from the air inlet area, and preventing the main airflow in the air inlet area from flowing into the second channel.

In an embodiment, the connecting plate is an arc-shaped sheet. The connecting plate is arc-shaped, so that a resistance to an airflow may be reduced, and losses of the airflow flowing through the connecting plate may be reduced.

In an embodiment, the connecting plate is a rectangular sheet.

In an embodiment, the air duct further includes a conveying area, and the conveying area is located between the air inlet area and the air outlet area, and is communicated with the air inlet area and the air outlet area respectively. The conveying area separates the air inlet area from the air outlet area, so that the blades located in the air inlet area are separated from the flow guiding member located in the air outlet area to prevent the blades from interfering with the flow guiding member when rotating.

In an embodiment, the body includes an end cover, a bottom cover, and a peripheral plate, the end cover and the bottom cover are opposite and spaced apart, two opposite sides of the peripheral plate in the thickness direction of the fan are connected to the end cover and the bottom cover respectively, the end cover, the bottom cover, and the peripheral plate form the air duct, the end cover and the bottom cover form the air outlet, and the flow guiding inlet is formed on the end cover and/or the bottom cover; and the flow guiding member is mounted between the end cover and the bottom cover. Therefore, the body has a simple structure, is easy to machine, and require low costs.

In an embodiment, the bottom cover, the peripheral plate, and the flow guiding member are integrally formed into a base, and the end cover is detachably connected to the peripheral plate; the sleeve includes a first sleeve, the first sleeve is located in the first channel and includes an end wall surface facing the end cover, and the end wall surface is hermetically bonded to the end cover. Therefore, machining is easy, and the end cover can be easily removed to overhaul components such as the blades. In addition, the end wall surface is bonded to the end cover to prevent the flow guiding cavity from being communicated with the first channel or the third channel, and prevent the main airflow from entering the second channel.

According to a second aspect, an embodiment of this application provides an electronic device, including a housing and a heat sink, where the housing includes an accommodating cavity, and an air vent and a thermovent that are communicated with the accommodating cavity, the heat sink is mounted in the accommodating cavity, the heat sink includes the fan according to the first aspect of this embodiment of this application, the air inlet of the fan faces the air vent, and the air outlet of the fan faces the thermovent.

BRIEF DESCRIPTION OF DRAWINGS

To describe technical solutions in embodiments or the background of this application more clearly, the following describes accompanying drawings required in embodiments or the background of this application.

DESCRIPTION OF EMBODIMENTS

Embodiments of this application will be described with reference to accompanying drawings in embodiments of this application.

Figure 1:
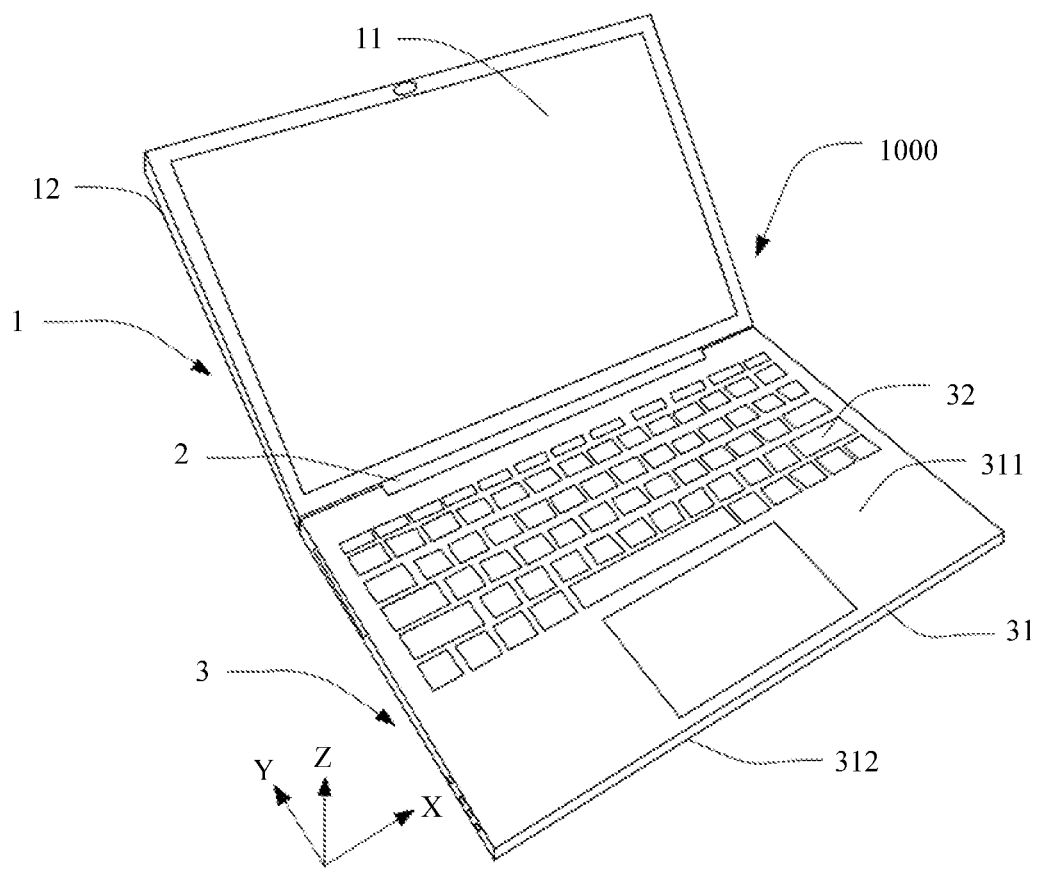
FIG. 1 is a schematic diagram of a structure of an electronic device in a state according to an embodiment of this application.
Figure 2:
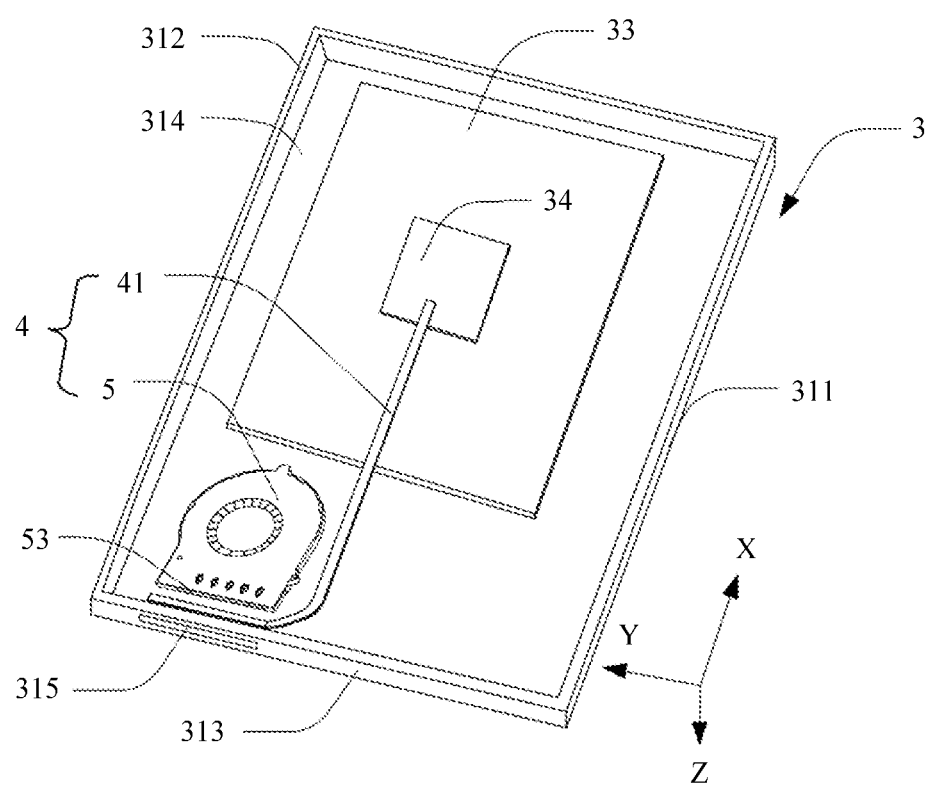
FIG. 2 is a schematic diagram of a structure of a housing part of the electronic device shown in FIG. 1.

Referring to FIG. 1 and FIG. 2, FIG. 1 is a schematic diagram of a structure of an electronic device according to an embodiment of this application in a state; and FIG. 2 is a schematic diagram of a structure of a housing of the electronic device shown in FIG. 1 in an open state. An embodiment of this application provides an electronic device 1000, and the electronic device 1000 is an electronic product such as a game console, a notebook computer, a personal digital assistant, a learning machine, and a tablet computer. In this embodiment, that the electronic device 1000 is a notebook computer is used as an example for description.

For ease of description, a length direction of the electronic device 1000 is defined as an X-axis direction, a width direction of the electronic device 1000 is defined as a Y-axis direction, and a thickness direction of the electronic device 1000 is defined as a Z-axis direction. The X-axis direction, the Y-axis direction, and the Z-axis direction are perpendicular to each other.

In this embodiment, the electronic device 1000 includes a display 1, a rotating shaft member 2, and a main body 3. The display 1 is connected to the main body 3 by using the rotating shaft member 2, and the display 1 may be unfolded or folded with respect to the main body 3. When the display 1 is unfolded with respect to the main body 3, the display 1 is at an angle to the main body 3, and the electronic device 1000 may be used by a user; and when the display 1 is folded with respect to the main body 3, the electronic device 1000 is in a standby state or shutdown state for easy storage.

In this embodiment, the display 1 includes a display surface 11 and an appearance surface 12 that face away from each other. When the display 1 is folded with respect to the main body 3, the display surface 11 is attached to the main body 3, and the appearance surface 12 is exposed to be in a visible state; and when the display 1 is unfolded with respect to the main body 3, the display surface 11 is in a visible state for observation and operation by the user.

The rotating shaft member 2 is a hinge connected between the display 1 and the main body 3. The rotating shaft member 2 is a rotating structure between the display 1 and the main body 3 to implement free rotation of the display 1 with respect to the main body 3.

The main body 3 includes a housing 31, a keyboard 32, electronic components (not marked in the figure), and a heat sink 4. The keyboard 32 is mounted on the housing 31, and the keyboard 32 is exposed with respect to the housing 31 for the user to operate the keyboard 32. The electronic components and the heat sink 4 are mounted inside the housing 31. The electronic components include a circuit board 33, a processor 34, a memory bank, a video card, and the like. The processor 34, the memory bank, and the video card are integrated on the circuit board 33. Specifically, the keyboard 32 is electrically connected to the processor 34, the user may operate the keyboard 32 to generate an operation signal, and the processor 34 may process the operation signal. The heat sink 4 is connected to the electronic components, and the heat sink 4 dissipates heat generated during operation of the electronic components, especially obvious heat generated when the processor 34 and the video card are operating. After heat dissipation, the heat sink 4 can prevent the electronic components from failure due to overheating.

The housing 31 is cuboid, including a mounting wall 311, a bottom wall 312, a peripheral wall 313, a mounting cavity 314, a thermovent 315, and an air vent. The mounting wall 311 and the bottom wall 312 are disposed facing away from each other, and are respectively located on opposite sides of the peripheral wall 313. The mounting wall 311 is configured to mount the keyboard 32. When the display 1 is folded with respect to the main body 3, the mounting wall 311 is attached to the display 1 to shield and protect the keyboard 32; and when the display 1 is unfolded with respect to the main body 3, the mounting wall 311 is exposed to expose the keyboard 32 for the user to operate. The bottom wall 312 may be in contact with a desktop to support the electronic device 1000. The mounting wall 311, the bottom wall 312, and the peripheral wall 313 form a mounting cavity 314, and the mounting cavity 314 is configured to accommodate the electronic components and the heat sink 4. The thermovent 315 is disposed on the peripheral wall 313, and is configured to be communicated with the outside and the mounting cavity 314, so that heat from the electronic components can flow to the outside through the thermovent 315. The air vent is disposed on the bottom wall 312, and is configured to be communicated with the outside and the mounting cavity 314, so that outside air can enter the mounting cavity 314 for the fan 5 of the heat sink 4 to operate.

The heat sink 4 is mounted in the mounting cavity 314 of the housing 31, and includes a heat pipe 41, a heat dissipation soldering iron (not shown in the figure), and the fan 5. The heat pipe 41 is a copper pipe, and the heat dissipation soldering iron is laminated on the electronic components. One end of the heat pipe 41 is laminated on the heat dissipation soldering iron, and the other end is provided with fins, the fins are located at the air outlet 53 of the fan 5, and the air outlet 53 of the fan 5 faces the thermovent 315 of the housing 31. When the notebook computer is operating, the heat pipe 41 conducts heat from the electronic components to the fins, and the fan 5 supplies an air volume to the fins to dissipate the heat from the fins, so as to transfer the heat from the electronic components to the outside through the thermovent 315.

Figure 3:
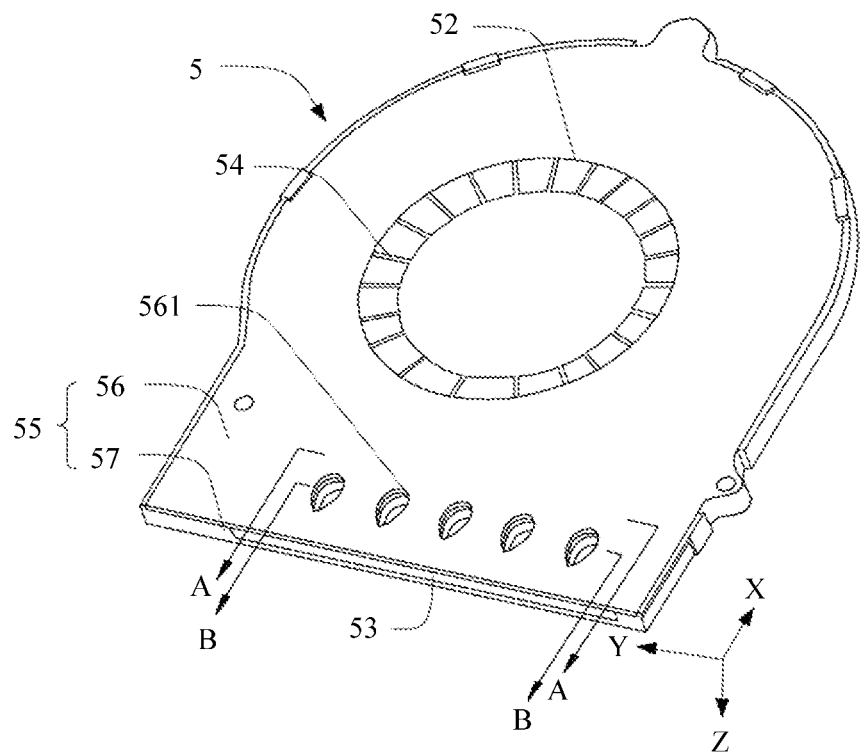
FIG. 3 is a schematic diagram of a structure of a fan in the housing shown in FIG. 2.
Figure 4:
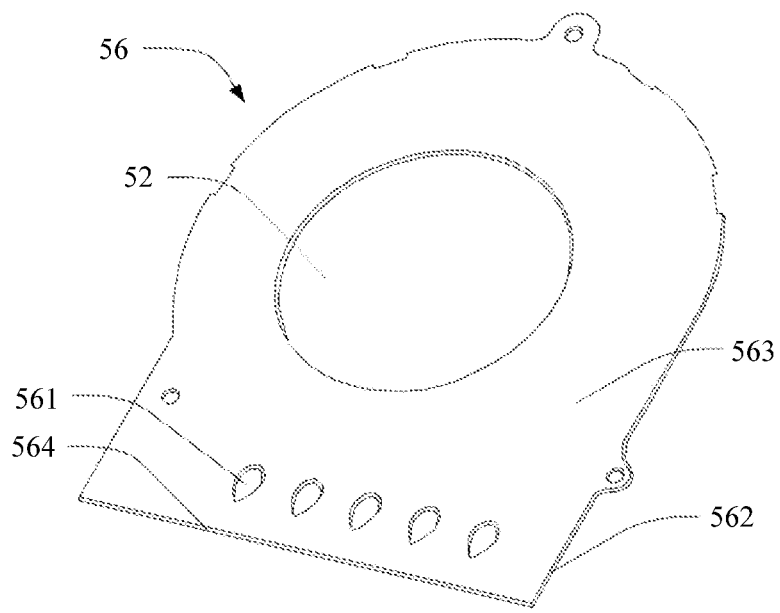
FIG. 4 is a schematic diagram of a structure of an end cover of the fan shown in FIG. 3.
Figure 5:
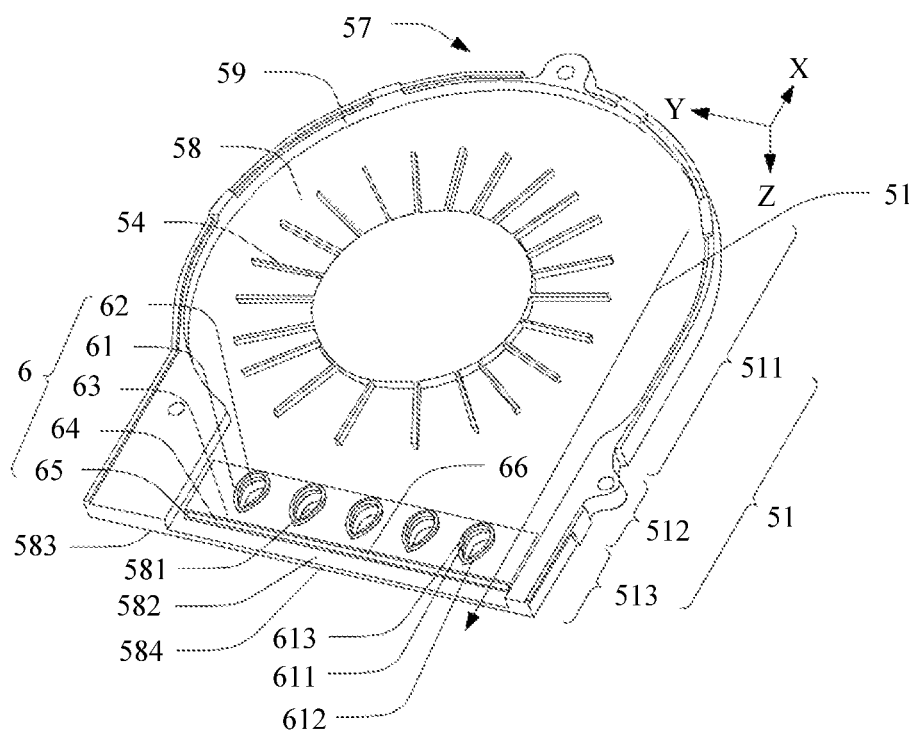
FIG. 5 is a schematic diagram of a structure of a base of the fan shown in FIG. 3.

Referring to FIG. 3 to FIG. 5, and with reference to FIG. 2, FIG. 3 is a schematic diagram of a structure of the fan shown in FIG. 2, FIG. 4 is a schematic diagram of a structure of an end cover of the fan shown in FIG. 3, and FIG. 5 is a schematic diagram of a structure of a base of the fan shown in FIG. 3. The fan 5 is mounted in the mounting cavity 314. The fan 5 includes an air duct 51, an air inlet 52, an air outlet 53, blades 54, and a body 55. The air inlet 52, the air outlet 53, and the air duct 51 are all mounted on the body 55, and the blades 54 are mounted in the air duct 51. Specifically, the air inlet 52 is configured to be communicated with the mounting cavity 314 of the housing 31 and one side of the air duct 51, and the air outlet 53 is configured to be communicated with the mounting cavity 314 of the housing 31 and the other side of the air duct 51. An airflow enters the air duct 51 through the air inlet 52 and flows out from the air outlet 53.

Figure 6:
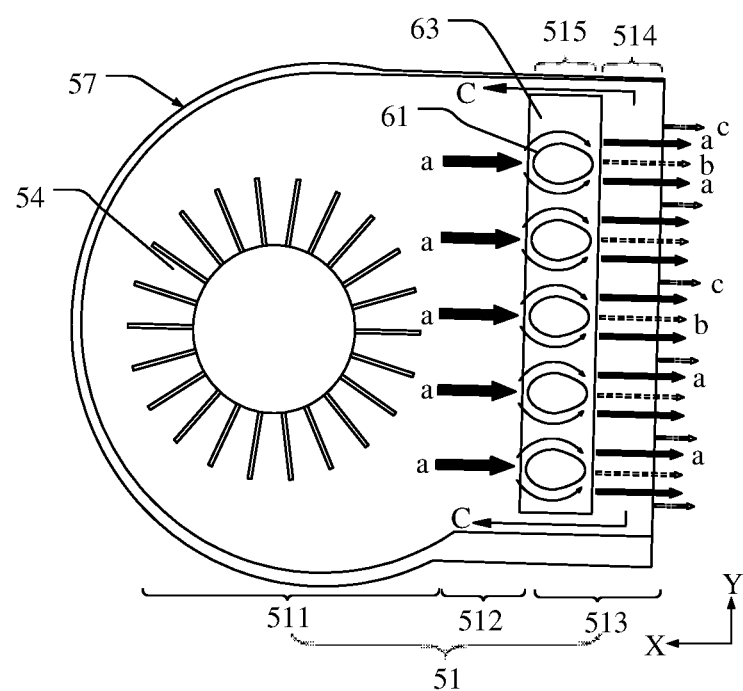
FIG. 6 is a schematic diagram showing an airflow direction of the fan shown in FIG. 3.

Referring to FIG. 6, and with reference to FIG. 3 to FIG. 5, FIG. 6 is a schematic diagram showing an airflow direction of the fan shown in FIG. 3. When the notebook computer is operating, the fan 5 is operating. In this case, the blades 54 of the fan 5 rotate to allow outside air to enter the air duct 51 through the air vent of the housing 31 and the air inlet 52 of the fan 5. The air entering the air duct 51 forms a main airflow a, and then flows out from the air outlet 53 and blows to the fins, so that heat from the fins can be dissipated through the thermovent 315 of the housing 31.

Referring to FIG. 3 to FIG. 5, the body 55 includes an end cover 56 and a base 57, the base 57 includes a bottom cover 58 and a peripheral plate 59, and the end cover 56 is detachably fastened to the base 57. The end cover 56 and the bottom cover 58 are oppositely disposed, and are respectively located on opposite sides of the peripheral plate 59 in the Z-axis direction. The end cover 56 is detachably fastened to the peripheral plate 59, and the end cover 56, the bottom cover 58, and the peripheral plate 59 form the air duct 51. When the fan 5 is mounted in the mounting cavity 314, the end cover 56 is opposite to the bottom wall 312 of the housing 31, and the air inlet 52 is disposed on the end cover 56, so that the air inlet 52 can be opposite to the air vent, thereby improving air intake efficiency. The peripheral plate 59 is opposite to the peripheral wall 313 of the housing 31, and the air outlet 53 is disposed on the peripheral plate 59, so that the air outlet 53 can be opposite to the thermovent 315, thereby improving heat dissipation efficiency. In other embodiments, the end cover 56 and the base 57 are integrally formed to strengthen a structural strength of the body 55.

Referring to FIG. 5 and FIG. 6, the air duct 51 includes an air inlet area 511, a conveying area 512, and an air outlet area 513 that are distributed in the X-axis direction (air outlet direction) and sequentially communicated. The air inlet area 511 is communicated with the air inlet 52, and the air outlet area 513 is communicated with the air outlet 53. The blades 54 are mounted on the bottom cover 58, and are located in the air inlet area 511 of the air duct 51; and the conveying area 512 is located between the air inlet area 511 and the air outlet area 513 to prevent the blades 54 from touching a component mounted in the air outlet area 513 when rotating. When the fan 5 is operating, the blades 54 of the fan 5 rotate to allow air to enter the air inlet area 511 of the air duct 51 from the air inlet 52 of the fan 5. The main airflow a formed by the air entering the air inlet area 511 flows through the conveying area 512 to the air outlet area 513, and then flows out from the air outlet 53 and blows to the fins, so that heat from the fins can be dissipated through the thermovent 315 of the housing 31. In other embodiments, the air duct 51 includes an air inlet area and an air outlet area, and no conveying area is provided. Therefore, a size of the air duct 51 in the X-axis direction may be reduced, thereby reducing a volume of the entire fan to save space.

Referring to FIG. 3 and FIG. 4, the air inlet 52 in this embodiment is circular, and is corresponding to and communicated with the air inlet area 511. When the fan 5 is mounted in the mounting cavity 314, the air inlet 52 is corresponding to the air vent of the housing 31 and is communicated with the air vent of the housing 31, and the air inlet 52 allows outside air to enter the air duct 51 through the air vent of the housing 31. In other embodiments, the air inlet 52 is square, elliptical, trapezoidal, triangular, or the like, which may be set specifically based on a shape and a size of the end cover 56.

Referring to FIG. 3, the air outlet 53 is rectangular, and is corresponding to and communicated with the air outlet area 513. When the fan 5 is mounted in the mounting cavity 314, the air outlet 53 is corresponding to and communicated with the thermovent 315 of the housing 31, and the air outlet 53 allows the main airflow formed through rotation of the blades 54 to blow to the fins, and is finally dissipated from the thermovent 315. In other embodiments, the air outlet 53 is trapezoidal, elliptical, or the like, which may be set specifically based on a shape and a size of the peripheral plate 59.

Referring to FIG. 5, the blades 54 are made of a plastic to reduce a weight of the heat sink 4. The blades 54 are mounted on the bottom cover 58, and are located in the air inlet area 511. At least a part of the blades 54 is exposed with respect to the air inlet 52. The blades 54 may be driven by a motor to rotate, so that the air entering the air duct 51 forms the main airflow. There are a plurality of blades 54, where "a plurality of" means two or more. The plurality of blades 54 are fastened to a rotating shaft disposed on the bottom cover 58, and the rotating shaft rotates to drive the blades 54 to rotate, so that the blades 54 drive air to form the main airflow.

Figure 7:
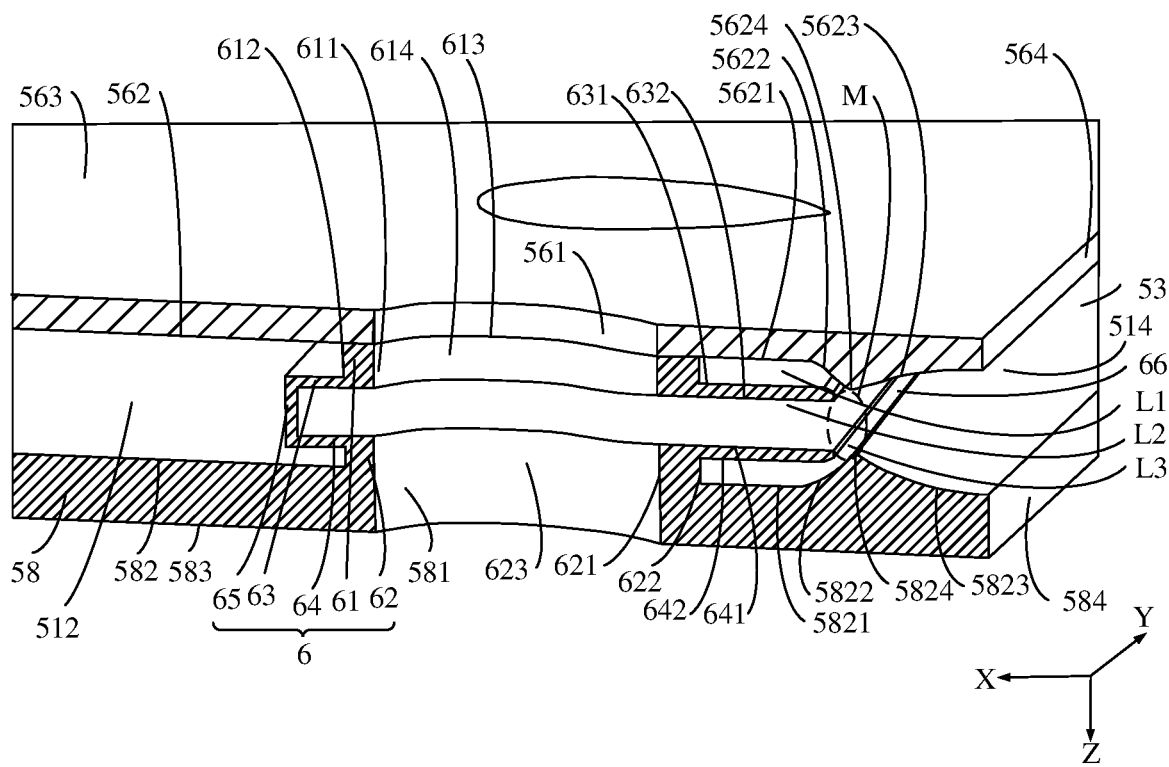
FIG. 7 is a schematic diagram of a partially internal structure of the fan shown in FIG. 3.

The body 55 is made of a stainless steel or a plastic to enhance a structural strength of the fan 5, thereby prolonging a service life of the fan 5. Referring to FIG. 7, and with reference to FIG. 6, FIG. 7 is a schematic diagram of a partially internal structure of the fan shown in FIG. 3. The body 55 further includes a flow guiding member 6.

Specifically, the air outlet area 513 includes a mounting area 515 and a guide area 514 that are distributed in the X-axis direction, the mounting area 515 faces the conveying area 512, and the guide area 514 faces the air outlet 53. The flow guiding member 6 is mounted in the mounting area 515 of the air duct 51, and is fixedly connected to the bottom cover 58. Because the conveying area 512 is located between the mounting area 515 and the air inlet area 511, the blades 54 in the air inlet area 511 may be prevented from touching the flow guiding member 6 to increase a safety coefficient.

In this embodiment, referring to FIG. 5, the bottom cover 58, the peripheral plate 59 and the flow guiding member 6 are integrally formed into a base 57, and the end cover 56 and the base 57 are detachably fastened by using a buckle and/or a screw, so that the end cover 56 may be separated from the base 57 to expose the mounting cavity 314 for cleaning, maintaining, or replacing the blades 54. In other embodiments, the bottom cover 58, the peripheral plate 59, and the flow guiding member 6 are separately formed, and then fixedly connected through welding.

In this embodiment, with reference to FIG. 4 and FIG. 7, the end cover 56 is a sheet, and includes a first flow guiding inlet 561, a first guide surface 562, a first appearance surface 563, and a first peripheral wall surface 564. The first flow guiding inlet 561 penetrates through the first guide surface 562 and the first appearance surface 563, and is configured to correspond to the air outlet area 513 of the air duct 51. A cross section of the first flow guiding inlet 561 is streamlined, and the first flow guiding inlet 561 is configured to be communicated with the interior of the flow guiding member 6, so that air enters the interior of the flow guiding member 6 along the first flow guiding inlet 561 to form a first induced airflow b1, so as to increase a total air output. The first guide surface 562 is disposed away from the first appearance surface 563 in the Z-axis direction, and the first peripheral wall surface 564 is connected between the first guide surface 562 and the first appearance surface 563. The first guide surface 562 faces the air duct, and when the fan 5 is not mounted in the mounting cavity 314, the first appearance surface 563 is located outside and is in a visible state. At least a part of the first peripheral wall surface 564 is located at the air outlet, and is configured to form the air outlet 53 with the base 57. In other embodiments, the first flow guiding inlet 561 is circular, elliptical, square, triangular, or the like, which is not limited in this application.

Figure 8:
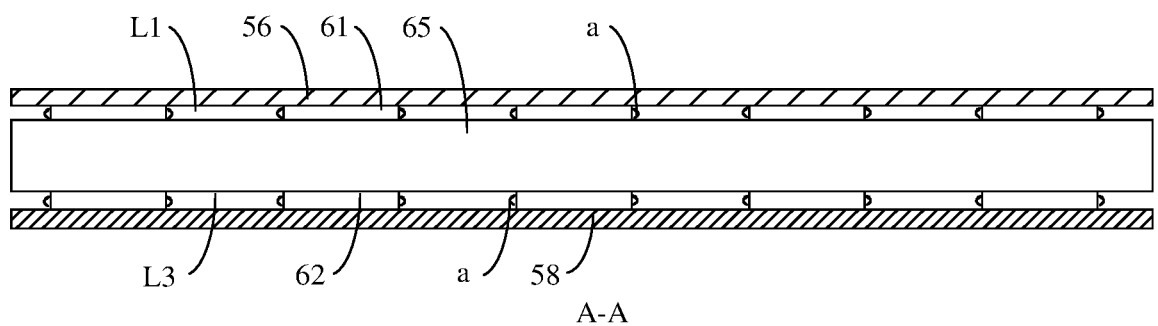
FIG. 8 is a sectional view taken along an A-A direction in FIG. 3.
Figure 9:
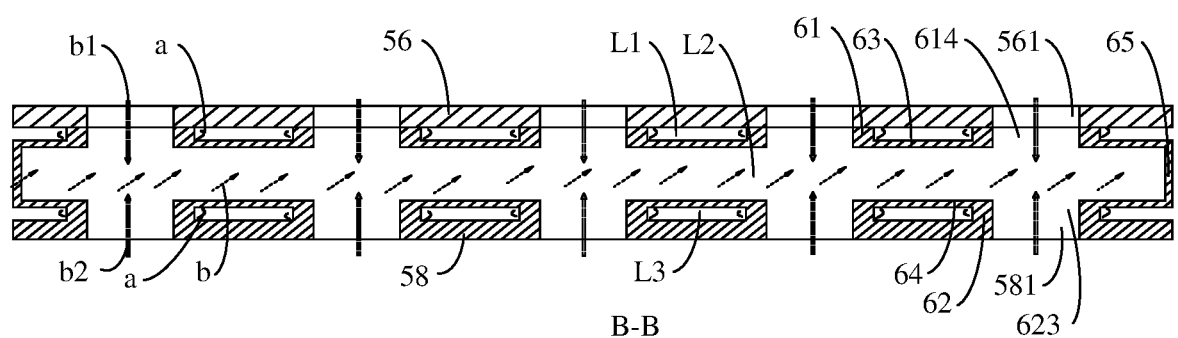
FIG. 9 is a sectional view taken along a B-B direction in FIG. 3.
Figure 10:
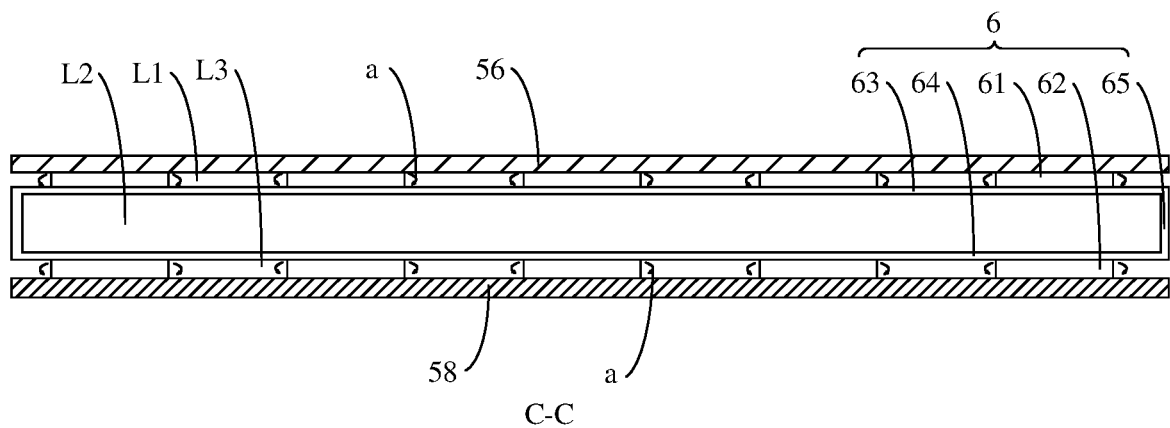
FIG. 10 is a sectional view taken along a C-C direction in FIG. 6.

Referring to FIG. 8 to FIG. 10, FIG. 8 is a sectional view taken along an A-A direction in FIG. 3; FIG. 9 is a sectional view taken along a B-B direction in FIG. 3; and FIG. 10 is a sectional view taken along a C-C direction in FIG. 6; and with reference to FIG. 5, the bottom cover 58 of the base 57 is a sheet, and the bottom cover 58 includes a second flow guiding inlet 581, a second guide surface 582, a second appearance surface 583, and a second peripheral wall surface 584. The second flow guiding inlet 581 penetrates through the second guide surface 582 and the second appearance surface 583, and is configured to correspond to the air outlet area 513 of the air duct 51; and the second flow guiding inlet 581 is streamlined, and the second flow guiding inlet 581 is configured to be communicated with the interior of the flow guiding member 6, so that air enters the interior of the flow guiding member 6 along the second flow guiding inlet 581 to form a second induced airflow, so as to increase the total air output. The second guide surface 582 is disposed away from the second appearance surface 583, and the second peripheral wall surface 584 is connected between the second guide surface 582 and the second appearance surface 583. The second guide surface 582 faces the air duct, and when the fan is not mounted in the mounting cavity 314, the second appearance surface 583 is located outside and is in a visible state. At least a part of the second peripheral wall surface 584 is located at the air outlet, and is configured to form the air outlet 53 with the end cover 56. In other embodiments, the second flow guiding inlet 581 is circular, elliptical, square, triangular, or the like, which is not limited in this application.

Referring to FIG. 7 and FIG. 9, sizes and shapes of the first flow guiding inlet 561 and the second flow guiding inlet 581 are the same, and the end cover 56 and the bottom cover 58 are laminated. In the Z-axis direction, the first flow guiding inlet 561 and the second flow guiding inlet 581 are oppositely communicated, and air volumes of the first induced airflow b1 and a second induced airflow b2 generated by the first flow guiding inlet 561 and the second flow guiding inlet 581 are basically the same. Because the first induced airflow b1 flows from top down and the second induced airflow b2 flows from bottom up, when the air volumes of the first induced airflow b1 and the second induced airflow b2 are basically the same, most of the air volumes of the first induced airflow b1 and the second induced airflow b2 are mixed to form an induced airflow b, so as to reduce losses of the first induced airflow b1 flowing out of the second flow guiding inlet 581 and losses of the second induced airflow b2 flowing out of the first flow guiding inlet 561.

Referring to FIG. 5, the peripheral plate 59 is a sheet, and is located between the end cover 56 and the bottom cover 58. The peripheral plate 59 does not shield parts of the first peripheral wall surface 564 and the second peripheral wall surface 584 to form the air outlet 53 of the air duct 51 together with the end cover 56 and the bottom cover 58. The parts of first peripheral wall surface 564 and the second peripheral wall surface 584 are located on two sides of the air outlet 53 in the Z-axis direction.

Referring to FIG. 5 and FIG. 7, the flow guiding member 6 includes a first guide plate 63, a second guide plate 64, and a sleeve, a first channel is formed between the first guide plate 63 and an inner wall of the air duct 51, the first guide plate 63 and the second guide plate 64 are oppositely spaced apart to form a second channel, and a third channel is formed between the second guide plate 64 and the inner wall of the air duct 51; the first channel, the second channel, and the third channel are sequentially disposed in the thickness direction of the fan; and the sleeve is disposed in the first channel and/or the third channel, and the sleeve includes a flow guiding cavity. One side that is of the second channel and that faces the air inlet area 511 is isolated from the air inlet area 511, and one side that is of the second channel and that faces away from the air inlet area 511 forms a flow guiding outlet, and the flow guiding outlet and the air outlet face the same direction and are communicated. In the length direction of the fan, the air inlet area 511, the first channel, and the air outlet are sequentially communicated, and the air inlet area 511, the third channel, and the air outlet are sequentially communicated; and in the thickness direction of the fan, the flow guiding inlet, the flow guiding cavity, and the second channel are sequentially communicated. The sleeve includes a first sleeve and/or a second sleeve, a flow guiding cavity of the first sleeve is a first flow guiding cavity, a flow guiding cavity of the second sleeve is a second flow guiding cavity, and the flow guiding inlet includes a first flow guiding inlet and/or a second flow guiding inlet.

The air inlet area 511, the first channel, and the air outlet are sequentially communicated in the length direction of the fan to form a main airflow path, and the air inlet area 511, the third channel, the air outlet are sequentially communicated in the length direction of the fan to form another main airflow path, and the two main airflow paths are configured to circulate main airflows from rotation of the blades. The first guide plate 63 and/or the second guide plate 64 are provided with a connecting hole corresponding to the flow guiding cavity of the sleeve, and the connecting hole is communicated with the flow guiding cavity and the second channel. The flow guiding inlet, the flow guiding cavity and the connecting hole are aligned and communicated in the thickness direction of the fan to form an induced airflow channel, and the induced airflow channel is configured to circulate induced airflows.

More specifically, in this embodiment, the flow guiding member 6 is mounted in the mounting area 515 of the air outlet area 513 of the air duct 51. The flow guiding member 6 includes a first sleeve 61, a second sleeve 62, a first guide plate 63, a second guide plate 64, and a connecting plate 65; and the first sleeve 61, the first guide plate 63, the connecting plate 65, the second guide plate 64, and the second sleeve 62 are sequentially connected in the Z-axis direction. In addition, the first guide plate 63 and the second guide plate 64 surround peripheries of the first sleeve 61 and the second sleeve 62, respectively, the first guide plate 63 and the second guide plate 64 are oppositely spaced, and the connecting plate 65 is connected between the first guide plate 63 and the second guide plate 64; and the first sleeve 61 is connected to the end cover 56, and the second sleeve 62 is connected to the bottom cover 58. The flow guiding member 6 is communicated with the first flow guiding inlet 561 and the second flow guiding inlet 581.

Referring to FIG. 7, after the end cover 56 and the base 57 are assembled, a first channel L1 is formed between the first guide plate 63 and the end cover 56 in the Z-axis direction. The first channel L1 surrounds a periphery of the first sleeve 61 and is communicated with the conveying area 512 and the air outlet 53. A second channel L2 is formed among the first guide plate 63, the second guide plate 64 and the connecting plate 65, and a flow guiding outlet 66 is formed on one side opposite to the air outlet 53. The flow guiding outlet 66 faces the air outlet 53, so that the second channel L2 is communicated with the air outlet 53. In addition, the second channel L2 is isolated from the conveying area 512 by using the connecting plate 65. A third channel L3 is formed between the second guide plate 64 and the bottom cover 58. The third channel L3 surrounds a periphery of the second sleeve 62, and the third channel L3 is communicated with the conveying area 512 and the air outlet 53. In the Z-axis direction, the second channel L2 is located between the first channel L1 and the third channel L3. The first flow guiding inlet 561 and the second flow guiding inlet 581 are connected to the second channel L2 by using the first sleeve 61 and the second sleeve 62 respectively.

Referring to FIG. 7 and FIG. 9, two sides of the first sleeve 61 in the Z-axis direction are hermetically connected to the end cover 56 and the first guide plate 63 respectively. The first sleeve 61 is provided with a first flow guiding cavity 614 running in the Z-axis direction, and the first flow guiding cavity 614 is communicated with both the first flow guiding inlet and the second channel L2. Two sides of the second sleeve 62 in the Z-axis direction are hermetically connected to the second guide plate 64 and the bottom cover 58 respectively. The second sleeve 62 is provided with a second flow guiding cavity 623 running in the Z-axis direction, and the second flow guiding cavity 623 is communicated with both the second flow guiding inlet and the second channel L2.

Specifically, referring to FIG. 7 and FIG. 9, the first sleeve 61 is cylindrical, and includes a first inner wall surface 611, a first outer wall surface 612, and an end wall surface 613. The first inner wall surface 611 faces the first flow guiding cavity 614, the first outer wall surface 612 faces away from the first inner wall surface 611, and two sides of the end wall surface 613 are connected to the first inner wall surface 611 and the first outer wall surface 612 respectively. The end wall surface 613 faces the end cover 56, and is hermetically connected to one surface of the end cover 56, and sides that are of the first inner wall surface 611 and the first outer wall surface 612 and that are away from the end wall surface 613 are hermetically connected to the first guide plate 63. An adhesive is applied in an area that is of the first guide surface 562 of the end cover 56 and that is corresponding to the end wall surface 613, or applied on the end wall surface 613. When the end cover 56 is buckled on the base 57, the adhesive fixedly adheres the first guide surface 562 and the end wall surface 613, so as to hermetically connect the end wall surface 613 and the end cover 56. In this embodiment, the flow guiding member 6 is integrally formed, so that sides that are of the first inner wall surface 611 and the first outer wall surface 612 and that are away from the end wall surface 613 can be hermetically connected to the first guide plate 63.

Referring to FIG. 7 and FIG. 9, the second sleeve 62 is cylindrical, and includes a second inner wall surface 621, a second outer wall surface 622, and a second flow guiding cavity 623. The second inner wall surface 621 faces the second flow guiding cavity 623, the second outer wall surface 622 faces away from the second inner wall surface 621, sides that are of the first inner wall surface 611 and the second outer wall surface 622 in the Z-axis direction are hermetically connected to the second guide plate 64 respectively, and the other sides are respectively connected to the bottom cover 58. Specifically, the flow guiding member 6 and the bottom cover are integrally formed, so that the first inner wall surface 611 and the second inner wall surface 621 are hermetically connected to the second guide plate 64 and the bottom cover 58.

Referring to FIG. 7, the first guide plate 63 is disposed around the periphery of the first sleeve 61, and includes a first surface 631 and a second surface 632 that face away from each other in the Z-axis direction, and the first surface 631 is connected to the first outer wall surface 612; and the first guide surface 562 and the first surface 631 form the first channel L1. The second guide plate 64 and the first guide plate 63 are oppositely spaced, and the second channel L2 is formed between the first guide plate 63 and the second guide plate 64. The second guide plate 64 is disposed around the periphery of the second sleeve 62, and includes a third surface 641 and a fourth surface 642 that face away from each other in the Z-axis direction. The third surface 641 is connected to the second outer wall surface 622, and the fourth surface 642 and the second guide surface 582 form the third channel L3; the second surface 632 and the third surface 641 face the second channel L2, and one side that is of the first sleeve 61 and that is connected to the first guide plate 63 and one end face that is of the second sleeve 62 and that is connected to the second guide plate 64 face the second channel L2.

Referring to FIG. 9, in a direction perpendicular to a Z axis, sectional areas and shapes of the first flow guiding cavity 614, the second flow guiding cavity 623, the first flow guiding inlet 561, and the second flow guiding inlet 581 are the same, that is, projections of the first flow guiding cavity 614, the second flow guiding cavity 623, the first flow guiding inlet 561, and the second flow guiding inlet 581 in the direction perpendicular to the Z axis coincide, so as to facilitate machining, and ensure that airflows can smoothly circulate to the first flow guiding cavity 614 and the second flow guiding cavity 623 after entering the first flow guiding inlet 561 and the second flow guiding inlet 581, thereby increasing an air volume of an induced airflow, and preventing airflow damage due to misalignment of the cavities and the inlets.

Figure 12:
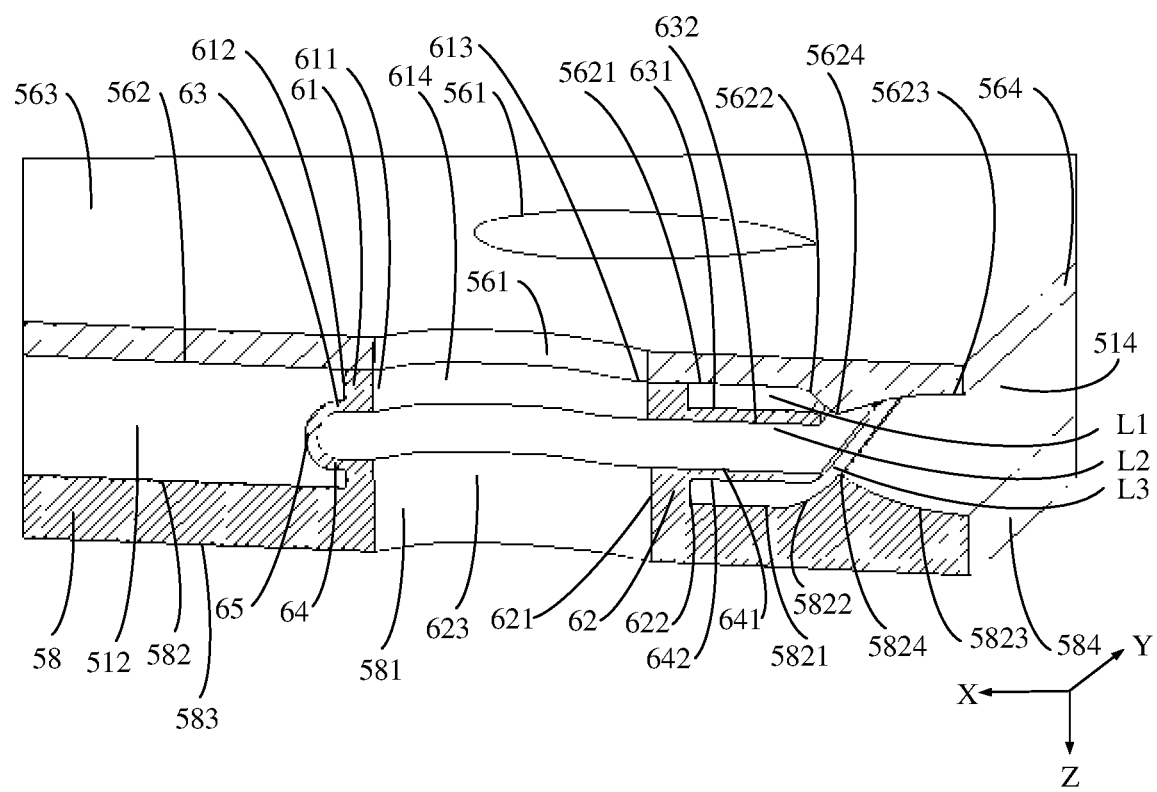
FIG. 12 is a schematic diagram of a partially internal structure according to another implementation of the fan shown in FIG. 3.

Referring to FIG. 7, FIG. 8, and FIG. 9, the connecting plate 65 is connected between the first guide plate 63 and the second guide plate 64. Specifically, two sides of the connecting plate 65 in the Z-axis direction are respectively connected to sides that are of the first guide plate 63 and the second guide plate 64 and that face the conveying area 512, so as to isolate the second channel L2 from the conveying area 512, and prevent an airflow from the conveying area 512 from flowing into the second channel L2; sides that are of the first guide plate 63 and the second guide plate 64 and that face the air outlet 53 are spaced apart to form the flow guiding outlet 66, and the flow guiding outlet 66 faces the air outlet 53, so that the second channel L2 is communicated with the air outlet 53. In this embodiment, the connecting plate 65 is a rectangular sheet to facilitate machining. Referring to FIG. 7, FIG. 8, and FIG. 10, the connecting plate 65 extends to seal two opposite sides of the first guide plate 63 and the second guide plate 64 along a Y axis. In this case, the second channel L2 has a structure with three sides closed and one side open, and the open side is the flow guiding outlet 66. In other embodiments, the connecting plate 65 seals only one side that is of the first channel L1 and that faces the conveying area 512, and the other three sides of the second channel L2 are open. In this case, a weight of the connecting plate 65 is reduced, which facilitates a lightweight design of the entire fan. In other embodiments, referring to FIG. 12, FIG. 12 is a schematic diagram of a partially internal structure according to another implementation of the fan shown in FIG. 3. The connecting plate 65 is an arc-shaped sheet. In this case, one side that is of the connecting plate 65 and that faces away from the second channel L2 has a low resistance to a main airflow that flows through, so as to reduce losses of the main airflow. One side that is of the connecting plate 65 and that faces the second channel L2 has a low resistance to an induced airflow, so as to reduce losses of the induced airflow.

Figure 11:
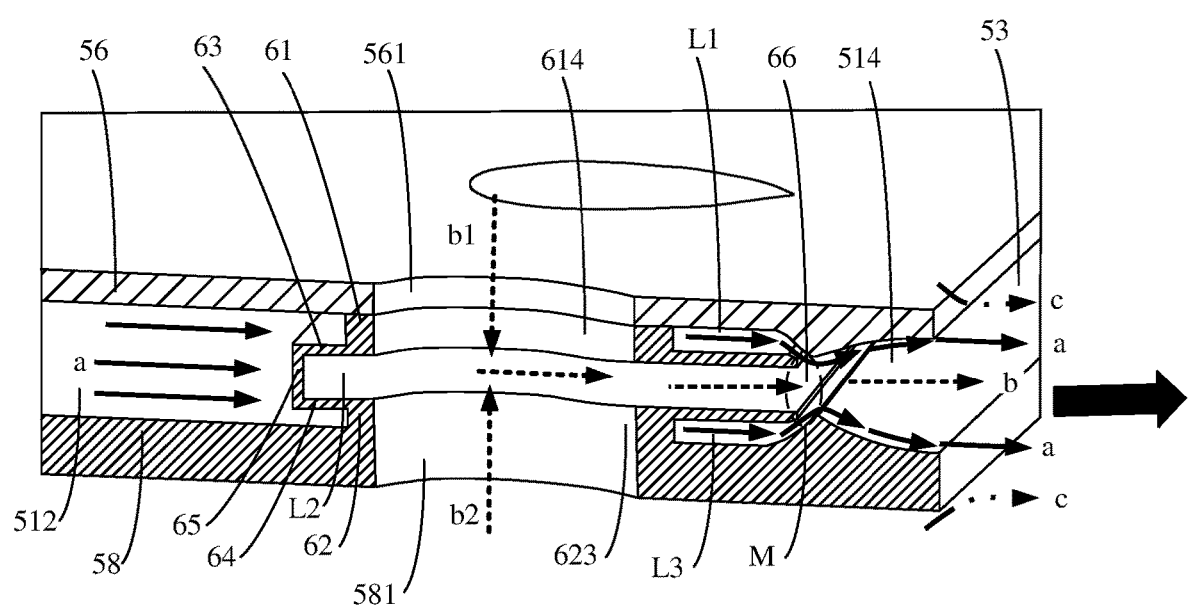
FIG. 11 is a schematic diagram showing an airflow in the schematic diagram of the internal structure shown in FIG. 7.

In this embodiment, referring to FIG. 11, FIG. 11 is a schematic diagram showing an airflow in the schematic diagram of the internal structure shown in FIG. 7. With reference to FIG. 6 to FIG. 10, when the fan 5 is operating, a main airflow a formed through rotation of the blades 54 flows in a direction from the air duct 51 to the air outlet 53.

When flowing through the flow guiding member 6, the main airflow a will bypass the connecting plate 65 due to blocking of the connecting plate 65, and then flow into the first channel L1 and the third channel L3. Due to blocking of the connecting plate 65, a volume of an available space for the main airflow a is reduced suddenly, and a flow rate of the main airflow a is increased. A part of the main airflow a entering the first channel L1 is blocked by the first outer wall surface 612 of the first sleeve 61, so that the volume of the available space is further reduced, and the flow rate is further increased. Based on the Bernoulli's principle, when the main airflow a flowing at a high speed in the first channel L1 flows through an upper side of the flow guiding outlet 66, a negative pressure area M will be formed near the flow guiding outlet 66. A differential pressure exists between air pressures in the negative pressure area M and the first flow guiding cavity 614. Under an action of the differential pressure, induced air enters the first flow guiding cavity 614 from the first flow guiding inlet 561, thereby forming the first induced airflow b1. A part of the main airflow a entering the third channel L3 is blocked by the second outer wall surface 622 of the second sleeve 62, so that the volume of the available space is further reduced, and the flow rate is further increased. Based on the Bernoulli's principle, when the main airflow a flowing at a high speed in the third channel L3 flows through a lower side of the flow guiding outlet 66, a negative pressure area M will be formed near the flow guiding outlet 66. A differential pressure exists between air pressures in the negative pressure area M and the second flow guiding cavity 623. Under an action of the differential pressure, induced air enters the second flow guiding cavity 623 from the second flow guiding inlet 581, thereby forming the second induced airflow b2; and after the first induced airflow b1 and the second induced airflow b2 are mixed in the second channel L2 into an induced airflow b, the induced airflow b flows to the air outlet 53 of the fan 5 along the flow guiding outlet 66. When the main airflow a finally flows to the air outlet 53 after bypassing the first sleeve 61 and the second sleeve 62, the main airflow a will rub against the first peripheral wall surface 564 and the second peripheral wall surface 584 that are located on two sides of the air outlet 53. Under an action of friction, the main airflow a flowing at a high speed drives air around the air outlet 53 to generate a driven airflow c. In this case, an air output of the fan 5 includes three parts: the main airflow a, the induced airflow b, and the driven airflow c. Compared with a conventional component without the flow guiding member 6, the air output is significantly increased, and therefore, heat dissipation efficiency is improved.

Still referring to FIG. 6, FIG. 7 and FIG. 11, in this embodiment, in the X-axis direction, the flow guiding member 6 is mounted in the mounting area 515, and the guide area 514 is formed between the mounting area 515 and the air outlet 53. In this case, the first guide plate 63 and the second guide plate 64 are retracted with respect to the air outlet to be hidden in the air duct 51. Therefore, the main airflow a flows out of the first channel L1 and the third channel L3, and then needs to pass through the guide area 514 before reaching the air outlet 53; and the induced airflow b flows out of the second channel L2, and then also needs to pass through the guide area 514 before reaching the air outlet 53. The guide area 514 may guide the induced airflow b and the main airflow a to make the airflows directional, and the directional airflows can slow down losses of airflow rates and increase an air output.

Referring to FIG. 7, in this embodiment, in the X-axis direction, a first convex portion 5624 is formed in the middle of a part that is of the first guide surface 562 and that faces the guide area 514, so that the first guide surface 562 is a surface with a Coanda effect. Specifically, in the X-axis direction, a part that is of the first guide surface 562 and that faces the air outlet area 513 includes a first plane section 5621, a first transition section 5622, and a first cambered section 5623 that are sequentially connected. The first transition section 5622 smoothly connects the first plane section 5621 and the first cambered section 5623, so that the first guide surface 562 is smoother. The first plane section 5621 and the first transition section 5622 face the first channel L1, and the first cambered section 5623 faces the guide area 514. In the X-axis direction, the first cambered section 5623 gradually inclines toward a direction close to the bottom cover 58, and then gradually inclines toward a direction away from the bottom cover 58, so that the first convex portion 5624 is formed in the middle of the first guide surface 562 in the X-axis direction, and the first convex portion 5624 extends in the Y-axis direction (thickness direction). Specifically, the middle is any position between two sides of the first cambered section 5623 in the X-axis direction. Therefore, after an airflow flows out of the third channel L3 from the first channel L1, the airflow leaves an original flow direction and instead is attached to the first cambered section 5623 to flow, so that the airflow can flow more smoothly, thereby reducing turbulence and increasing an air output.

Referring to FIG. 7, in the X-axis direction, a second convex portion 5824 is formed in the middle of a part that is of the second guide surface 582 and that faces the guide area 514, so that the second guide surface 582 is a surface with a Coanda effect. Specifically, in the X-axis direction, the second guide surface 582 includes a second plane section 5821, a second transition section 5822, and a second cambered section 5823 that are sequentially connected. The second transition section 5822 smoothly connects the second plane section 5821 and the second cambered section 5823, so that the second guide surface 582 is smoother. The second plane section 5821 and the second transition section 5822 face the second channel L2, and the second cambered section 5823 faces the guide area 514. In the X-axis direction, the second cambered section 5823 gradually inclines toward a direction close to the end cover 56, and then gradually inclines toward a direction away from the end cover 56, so that the second convex portion 5824 is formed in the middle of the second guide surface 582 in the X-axis direction, and the second convex portion 5824 extends in the Y-axis direction. Specifically, the middle is any position between two sides of the second cambered section in the X-axis direction. Therefore, after an airflow flows out of the third channel L3 from the first channel L1, the airflow leaves an original flow direction and instead is attached to the second cambered section 5823 to flow, so that the airflow can flow more smoothly, thereby reducing turbulence and increasing an air output.

Figure 13:
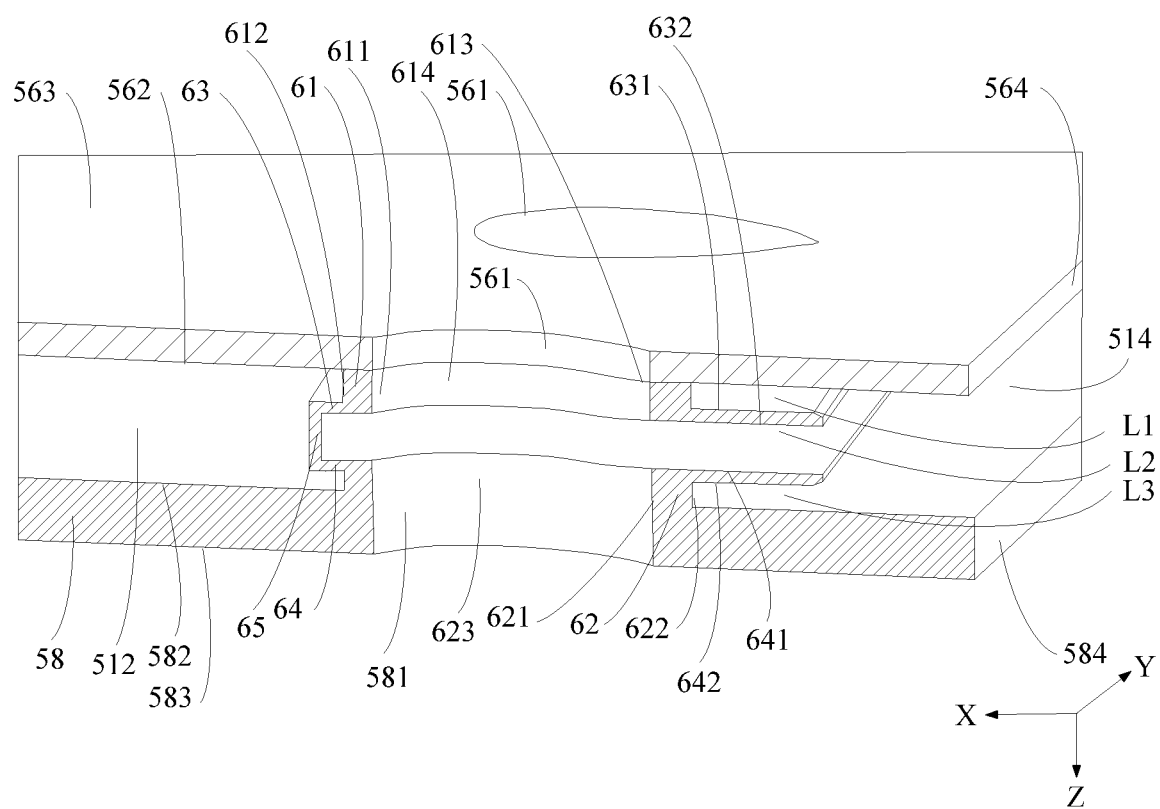
FIG. 13 is a schematic diagram of a partially internal structure according to still another implementation of the fan shown in FIG. 3.

FIG. 13 is a schematic diagram of a partially internal structure according to still another implementation of the fan shown in FIG. 3. In this implementation, a difference from that shown in FIG. 7 is that both the first guide surface 562 and the second guide surface 582 are flat for easy machining.

Figure 14:
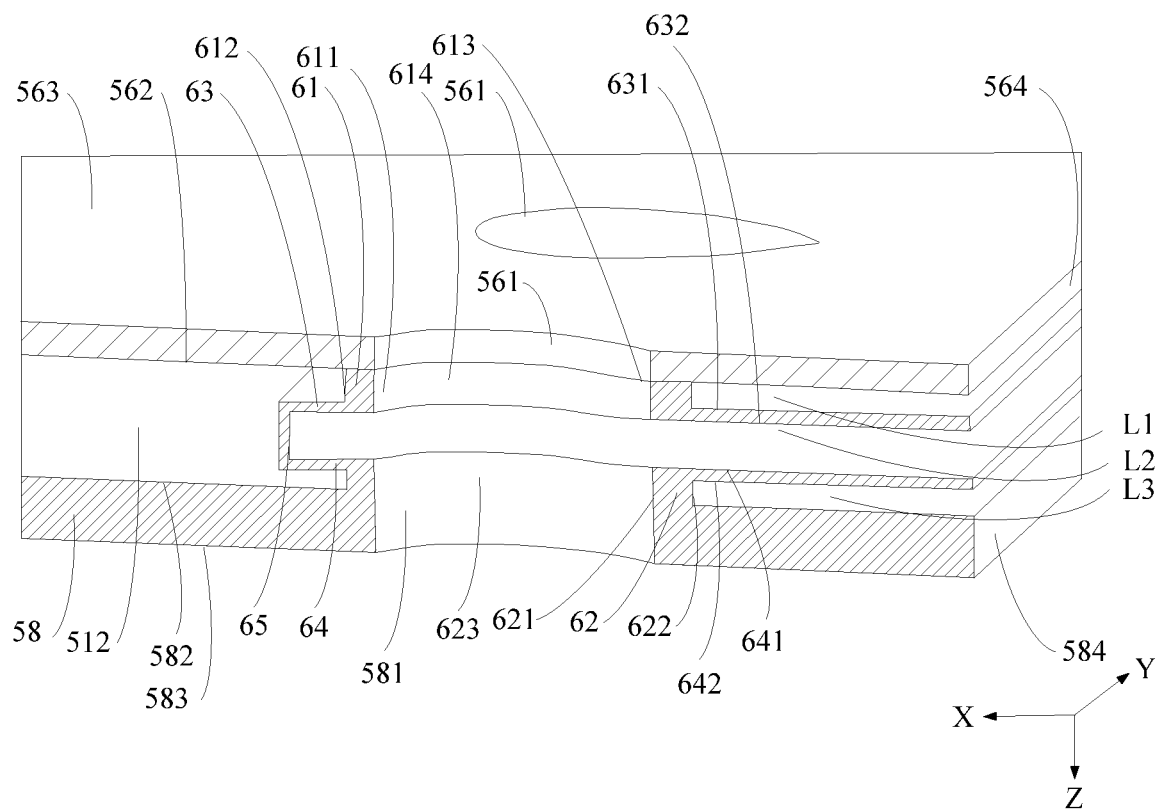
FIG. 14 is a schematic diagram of a partially internal structure according to yet another implementation of the fan shown in FIG. 3.

FIG. 14 is a schematic diagram of a partially internal structure according to yet another implementation of the fan shown in FIG. 3. In this implementation, the flow guiding member 6 is mounted in the air outlet area, and a size of the flow guiding member 6 in the X-axis direction is the same as that of the air outlet area. In this case, the first guide plate 63 and the second guide plate 64 are flush with the air outlet 53. Specifically, the first guide plate 63 and the second guide plate 64 each have one side and the other side that are disposed facing away from each other in the X-axis direction. In the X-axis direction, one side of the first guide plate 63 and one side of the second guide plate 64 are aligned with one side that is of the air outlet area 513 and that faces the conveying area 512, and the other side of the first guide plate 63 and the other side of the second guide plate 64 are aligned with the air outlet 53 to facilitate machining.

Referring to FIG. 5 and FIG. 7, in this embodiment, in the direction perpendicular to the Z axis, the first outer wall surface 612 of the first sleeve 61 is arc-shaped, so that the first outer wall surface 612 has a low resistance to a part of the main airflow a flowing in the first channel L1 to ensure that the main airflow a entering the first channel L1 has a high flow rate. In this way, a difference between air pressures in the negative pressure area M and the first flow guiding cavity 614 is large, and an air volume of the first induced airflow b1 is large. Therefore, the air output is increased to further improve the heat dissipation efficiency. Specifically, in this embodiment, in the direction perpendicular to the Z axis, the first outer wall surface 612 is streamlined, a relatively round part of the first outer wall surface 612 faces the conveying area 512 of the air duct 51, and a relatively sharp part faces the air outlet 53. In other embodiments, in the direction perpendicular to the Z axis, the first outer wall surface 612 is elliptical or circular.

Referring to FIG. 7, in the direction perpendicular to the Z axis, the second outer wall surface 622 of the second sleeve 62 is arc-shaped, so that the second outer wall surface 622 has a low resistance to a part of the main airflow a flowing in the third channel L3 to ensure that the main airflow a entering the third channel L3 has a high flow rate. In this way, a difference between air pressures in the negative pressure area M and the second flow guiding cavity 623 is large, and an air volume of the second induced airflow b2 is large. Therefore, the air output is increased to further improve the heat dissipation efficiency. Specifically, in this embodiment, in the direction perpendicular to the Z axis, the second outer wall surface 622 is streamlined, and a relatively round part of the second outer wall surface 622 faces the conveying area 512 of the air duct 51, and a relatively sharp part faces the air outlet 53. In other embodiments, in the direction perpendicular to the Z axis, the second outer wall surface 622 is elliptical or circular.

Referring to FIG. 3 and FIG. 5, in this embodiment, there are a plurality of first sleeves 61, where "a plurality of" means two or more. A specific quantity of the first sleeves 61 may be determined based on a quantity of the body 55. A larger size of the body 55 in the Y-axis direction indicates that more first sleeves 61 may be provided. On the contrary, a smaller size of the body 55 in the Y-axis direction indicates that fewer first sleeves 61 may be provided correspondingly. Specifically, a plurality of first sleeves 61 are equally spaced apart in the Y-axis direction, and the main airflow a entering the first channel L1 flows through two adjacent first sleeves 61 in a plurality of streams, so as to increase a flow rate of the main airflow a flowing in the first channel L1, increase a differential pressure between the negative pressure area M and the first flow guiding cavity 614, increase an air volume of the first induced airflow b1, and further increase a total air output. The plurality of first sleeves 61 are equally spaced apart, so that a part of the main airflow a entering the first channel L1 is evenly divided into a plurality of streams, and when the plurality of streams of main airflow finally converge at the air outlet 53, an air volume of the entire airflow is relatively uniform, so that heat may be uniformly dissipated from all parts of the fins, thereby improving a heat dissipation effect. In other embodiments, the plurality of first sleeves 61 are randomly distributed in the Y-axis direction, or are randomly distributed along the X axis. In other embodiments, the fan 5 includes a first sleeve 61 to simplify a structure of the fan 5 and reduce a weight of the fan 5.

Similarly, there are a plurality of second sleeves 62, where "a plurality of" means two or more. A specific quantity of the second sleeves 62 may be determined based on a quantity of the body 55. A larger size of the body 55 in the Y-axis direction indicates that more second sleeves 62 may be provided. On the contrary, a smaller size of the body 55 in the Y-axis direction indicates that fewer second sleeves 62 may be provided correspondingly. Specifically, a plurality of second sleeves 62 are equally spaced apart in the Y-axis direction, and a part of the main airflow a entering the third channel L3 flows through two adjacent second sleeves 62 in a plurality of streams, so as to increase a flow rate of the main airflow a flowing in the third channel L3, increase a differential pressure between the negative pressure area M and the second flow guiding cavity 623, increase an air volume of the second induced airflow b2, and further increase a total air output. The plurality of second sleeves 62 are equally spaced apart, so that a part of the main airflow a entering the second channel L2 is evenly divided into a plurality of streams, and when the plurality of streams of main airflow finally converge at the air outlet 53, an air volume of the entire airflow is relatively uniform, so that heat may be uniformly dissipated from all parts of the fins, thereby improving a heat dissipation effect. In other embodiments, the plurality of second sleeves 62 are randomly distributed in the Y-axis direction, or are randomly distributed along the X axis. In other embodiments, the fan 5 includes a second sleeve 62 to simplify a structure of the fan 5 and reduce a weight of the fan 5.

Figure 15:
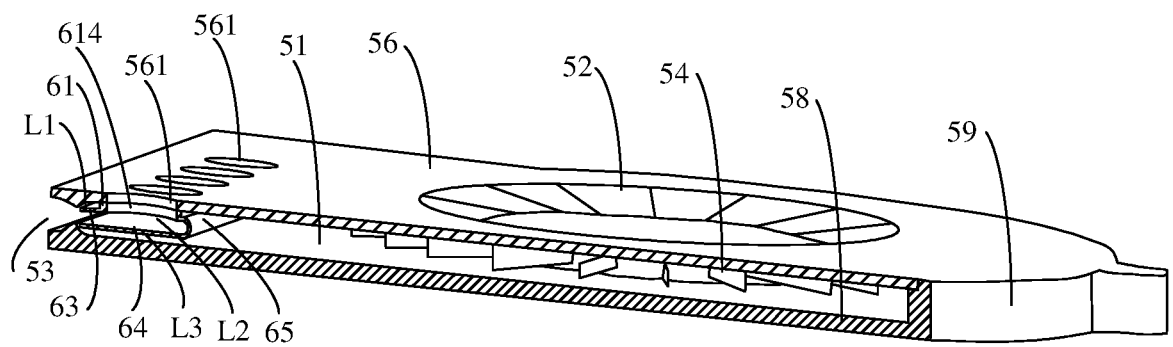
FIG. 15 is a schematic diagram of a structure of a fan according to another embodiment of this application.
Figure 16:
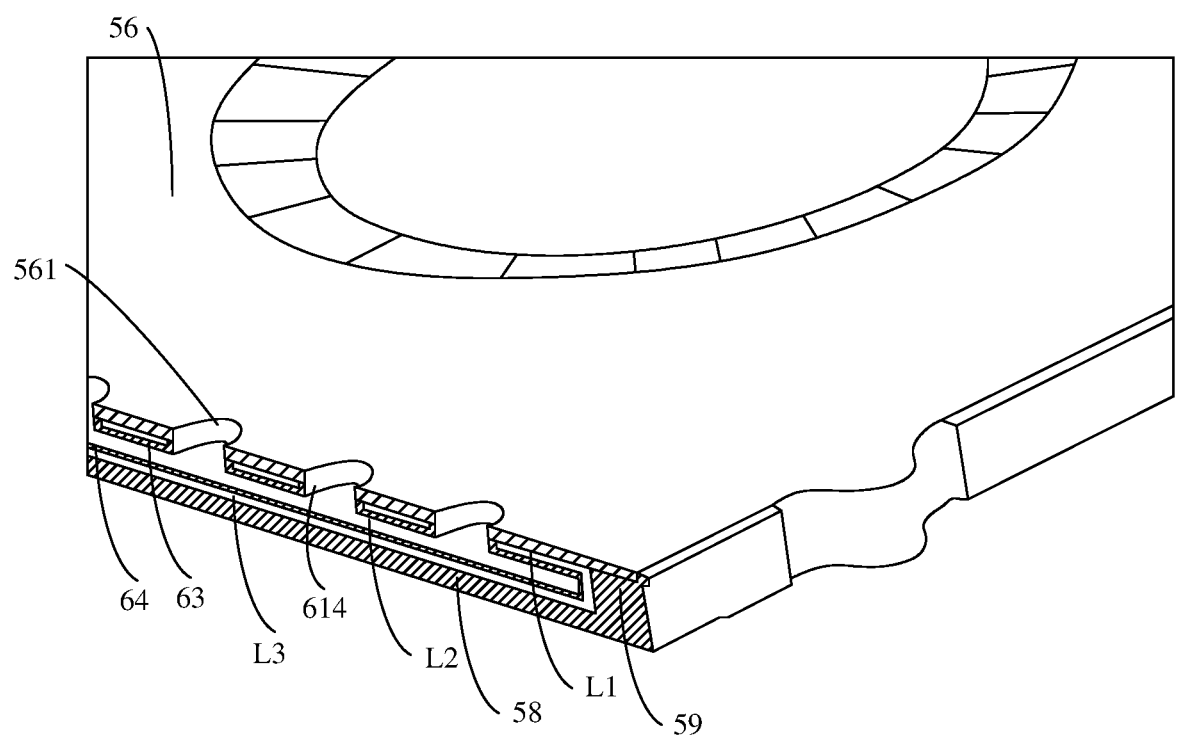
FIG. 16 is a schematic diagram of a structure of the fan shown in FIG. 15 from another perspective.

In other embodiments, referring to FIG. 15 and FIG. 16, FIG. 15 is a schematic diagram of a structure of a fan according to another embodiment of this application; and FIG. 16 is a schematic diagram of a structure of the fan shown in FIG. 15 from another perspective. Differences from the embodiment shown in FIG. 7 are that the first flow guiding inlet 561 is only disposed on the end cover 56, and the first sleeve 61 is disposed between the end cover 56 and the first guide plate 63. The end wall surface 613 of the first sleeve 61 is bonded or fixedly welded to the first guide surface, so that the first sleeve 61 and the end cover are sealed and fixedly connected. In this case, the flow guiding member 6 is fastened by a fixing force between the end wall surface 613 and the first guide surface. Differences from the embodiment shown in FIG. 7 are that the second flow guiding inlet is not disposed on the bottom cover 58, and the second sleeve 62 is not disposed between the bottom cover and the second guide plate 64, so as to simplify a structure of the flow guiding member 6 and reduce a weight of the fan.

In other embodiments, the second flow guiding inlet 581 is only disposed on the bottom cover 58, and the second sleeve 62 is disposed between the bottom cover 58 and the second guide plate 64. Differences from the embodiment shown in FIG. 7 are that the first flow guiding inlet is not disposed on the end cover 56, and the first sleeve 61 is not disposed between the end cover 56 and the first guide plate 63, so as to simplify a structure of the flow guiding member 6 and reduce a weight of the fan.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A fan, comprising a body, wherein an air duct, an air outlet and a flow guiding inlet that is communicated with the outside are formed in the body; and the air duct comprises an air inlet area and an air outlet area that are sequentially distributed and communicated in a length direction of the fan, the air outlet area is corresponding to the air outlet and is communicated with the air outlet, and a flow guiding member is disposed in the air outlet area;

the flow guiding member comprises a first guide plate, a second guide plate, and a sleeve, a first channel is formed between the first guide plate and an inner wall of the air duct, the first guide plate and the second guide plate are oppositely spaced apart to form a second channel, and a third channel is formed between the second guide plate and the inner wall of the air duct; the first channel, the second channel, and the third channel are sequentially disposed in a thickness direction of the fan; the sleeve is disposed in the first channel and/or the third channel, and the sleeve comprises a flow guiding cavity; and one side that is of the second channel and that faces the air inlet area is isolated from the air inlet area, one side that is of the second channel and that faces away from the air inlet area forms a flow guiding outlet, and the flow guiding outlet and the air outlet face the same direction and are communicated; and in the length direction of the fan, the air inlet area, the first channel, and the air outlet are sequentially communicated, and the air inlet area, the third channel, and the air outlet are sequentially communicated; and in the thickness direction of the fan, the flow guiding inlet, the flow guiding cavity, and the second channel are sequentially communicated.

2. The fan according to claim 1, wherein the body comprises an end cover, the end cover forms an inner wall that is of the air duct and that is corresponding to the first guide plate, the sleeve comprises a first sleeve, and the first sleeve is located in the first channel, and is hermetically connected to the end cover and the first guide plate respectively along two opposite ends in the thickness direction of the fan; and the flow guiding inlet comprises a first flow guiding inlet formed on the end cover, the flow guiding cavity comprises a first flow guiding cavity formed on the first sleeve, and the first flow guiding cavity is communicated with the first flow guiding inlet and the second channel.

3. The fan according to claim 2, wherein the first guide plate is disposed around a periphery of the first sleeve, so that the first channel surrounds the periphery of the first sleeve.

4. The fan according to claim 2, wherein the sleeve comprises a plurality of first sleeves, the flow guiding inlet comprises a plurality of first flow guiding inlets formed on the end cover, and the plurality of first flow guiding inlets are in a one-to-one communication with the plurality of first sleeves.

5. The fan according to claim 4, wherein the plurality of first sleeves and the plurality of first flow guiding inlets are equally spaced apart in the thickness direction of the fan.

6. The fan according to claim 1, wherein the body comprises a bottom cover, the bottom cover forms an inner wall that is of the air duct and that is corresponding to the second guide plate, the sleeve comprises a second sleeve, and the second sleeve is located in the third channel, and is hermetically connected to the bottom cover and the second guide plate respectively along two opposite ends in the thickness direction of the fan; and the flow guiding inlet comprises a second flow guiding inlet formed on the bottom cover, the flow guiding cavity comprises a second flow guiding cavity formed on the second sleeve, and the second flow guiding cavity is communicated with the second flow guiding inlet and the second channel.

7. The fan according to claim 6, wherein the second guide plate is disposed around a periphery of the second sleeve, so that the third channel surrounds the periphery of the second sleeve.

8. The fan according to claim 6, wherein the sleeve comprises a plurality of second sleeves, the flow guiding inlet comprises a plurality of second flow guiding inlets formed on the bottom cover, and the plurality of second flow guiding inlets are communicated with the plurality of second sleeves in a one-to-one correspondence.

9. The fan according to claim 8, wherein the plurality of second sleeves and the plurality of second flow guiding inlets are equally spaced apart in a width direction of the fan.

10. The fan according to claim 1, wherein in a direction perpendicular to the thickness direction, the flow guiding inlet and the flow guiding cavity are opposite, and have the same cross-sectional area and shape.

11. The fan according to claim 1, wherein in the length direction of the fan, widths of the first guide plate, the second guide plate, and the air outlet area are the same.

12. The fan according to claim 1, wherein the air outlet area comprises a mounting area and a guide area, the mounting area is corresponding to the air inlet area and is communicated with the air inlet area, and the guide area is corresponding to the air outlet and is communicated with the air outlet; and the flow guiding member is mounted in the mounting area, and in the length direction of the fan, widths of the first guide plate, the second guide plate, and the mounting area are the same.

13. The fan according to claim 12, wherein the body comprises an end cover and a bottom cover that are opposite and spaced apart, the end cover comprises a first guide surface facing the air duct, and a first convex portion is formed in the middle of a part that is of the first guide surface and that faces the guide area; and the bottom cover comprises a second guide surface facing the air duct, a second convex portion is formed in the middle of a part that is of the second guide surface and that faces the guide area, and the first convex portion and the second convex portion protrude toward each other.

14. The fan according to claim 1, wherein the sleeve comprises an inner wall surface facing the flow guiding cavity, and an outer wall surface facing away from the inner wall surface, and the outer wall surface is streamlined.

15. The fan according to claim 1, wherein the flow guiding member further comprises a connecting plate, two opposite sides of the connecting plate in the thickness direction of the fan are respectively connected to the first guide plate and the second guide plate, the connecting plate separates the second channel from the air inlet area, and sides that are of the first guide plate and the second guide plate and that face away from the connecting plate face the air outlet area and form the flow guiding outlet.

16. The fan according to claim 1, wherein the air duct further comprises a conveying area, and the conveying area is located between the air inlet area and the air outlet area, and is communicated with the air inlet area and the air outlet area respectively.

17. The fan according to claim 1, wherein the body further comprises an air inlet communicated with the air inlet area, and the fan further comprises blades mounted in the air inlet area.

18. The fan according to claim 1, wherein the body comprises an end cover, a bottom cover, and a peripheral plate, the end cover and the bottom cover are opposite and spaced apart, two opposite sides of the peripheral plate in the thickness direction of the fan are connected to the end cover and the bottom cover respectively, the end cover, the bottom cover, and the peripheral plate form the air duct, the end cover and the bottom cover form the air outlet, and the flow guiding inlet is formed on the end cover and/or the bottom cover; and the flow guiding member is mounted between the end cover and the bottom cover.

19. The fan according to claim 18, wherein the bottom cover, the peripheral plate, and the flow guiding member are integrally formed into a base, and the end cover is detachably connected to the peripheral plate; and the sleeve comprises a first sleeve, the first sleeve is located in the first channel and comprises an end wall surface facing the end cover, and the end wall surface is hermetically bonded to the end cover.

20. An electronic device, comprising a housing and a heat sink, wherein the housing comprises an accommodating cavity, as well as an air vent and a thermovent that are communicated with the accommodating cavity, the heat sink is mounted in the accommodating cavity, the heat sink comprises a fan, an air inlet of the fan faces the air vent, and an air outlet of the fan faces the thermovent;

the fan comprises a body, wherein an air duct, an air outlet and a flow guiding inlet that is communicated with the outside are formed in the body; and the air duct comprises an air inlet area and an air outlet area that are sequentially distributed and communicated in a length direction of the fan, the air outlet area is corresponding to the air outlet and is communicated with the air outlet, and a flow guiding member is disposed in the air outlet area;

the flow guiding member comprises a first guide plate, a second guide plate, and a sleeve, a first channel is formed between the first guide plate and an inner wall of the air duct, the first guide plate and the second guide plate are oppositely spaced apart to form a second channel, and a third channel is formed between the second guide plate and the inner wall of the air duct; the first channel, the second channel, and the third channel are sequentially disposed in a thickness direction of the fan; the sleeve is disposed in the first channel and/or the third channel, and the sleeve comprises a flow guiding cavity; and one side that is of the second channel and that faces the air inlet area is isolated from the air inlet area, one side that is of the second channel and that faces away from the air inlet area forms a flow guiding outlet, and the flow guiding outlet and the air outlet face the same direction and are communicated; and in the length direction of the fan, the air inlet area, the first channel, and the air outlet are sequentially communicated, and the air inlet area, the third channel, and the air outlet are sequentially communicated; and in the thickness direction of the fan, the flow guiding inlet, the flow guiding cavity, and the second channel are sequentially communicated.

\* \* \* \* \*